UNITED STATES PATENT OFFICE.

ERNEST SOLVAY, OF BRUSSELS, BELGIUM.

MANUFACTURE OF CHLORINE.

SPECIFICATION forming part of Letters Patent No. 316,195, dated April 21, 1885.

Application filed May 20,1884. (No specimens.) Patented in Belgium May 6, 1884, No. 65,070, and in France May 6, 1884, No. 161,938.

*To all whom it may concern:*

Be it known that I, ERNEST SOLVAY, a Belgian subject, residing at Brussels, in the Kingdom of Belgium, have invented certain new and useful Improvements in Compositions for the Manufacture of Chlorine; and I do hereby declare that the following is a full, clear, and exact description of the invention, which will enable others skilled in the art to which it appertains to make and use the same.

In the specification of Letters Patent granted to me in the United States bearing date the 31st of August, 1880, No. 231,858, for a new or improved process for the manufacture of cement, and the 21st of December, 1880, No. 235,820, for apparatus for the decomposition of chloride of calcium, I described the processes and apparatus employed by me in the manufacture of chlorine by means of chloride of calcium. Since that time I have continued my researches, and have invented the improvements hereinafter described relating to the preparation of the materials to be used in forming the mixture to be decomposed. When a mixture or composition for use in the manufacture of chlorine contains its ingredients in such relative proportions that the chloride of calcium contained therein corresponds with the required theoretical quantity of silica and alumina, a mass is obtained which softens under the influence of the temperature required for producing the reaction, the matter agglomerates, and the apparatus then works with difficulty. By adding more silica or alumina the required infusibility is obtained; but then the material is no longer suitable for the manufacture of cement; nor is it suited to be subjected to any chemical treatment whatever. The residuum is no longer so basic nor so soft. Now, I reconcile these two contrary conditions by introducing into the mixture a sufficient quantity of the residuum of a previous operation, which residuum is infusible at the temperatures required to produce reaction.

This new mixture resists heat sufficiently, although it contains quite as much lime as the mixture made in one single operation and containing the theoretical proportions of chloride of calcium and of silicious or aluminous substances.

Having thus described my invention, what I claim is—

The improved composition for use in the manufacture of chlorine, consisting of chloride of calcium, silica, alumina, and the residuum remaining after treatment of the composition in a previous operation, substantially as described.

ERNEST SOLVAY.

Witnesses:
R. S. KIRKPATRICK,
H. T. E. KIRKPATRICK.